US008625459B2

(12) United States Patent
Puthenpura et al.

(10) Patent No.: US 8,625,459 B2
(45) Date of Patent: Jan. 7, 2014

(54) METHOD AND APPARATUS FOR PLANNING RADIO NETWORK CONTROLLERS IN A WIRELESS NETWORK

(75) Inventors: Sarat Puthenpura, Berkeley Heights, NJ (US); Syed Anwar Aftab, Budd Lake, NJ (US); David G. Belanger, Hillsborough, NJ (US); Arun Jotshi, Parsippany, NJ (US); Sam Houston Parker, Cranbury, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 228 days.

(21) Appl. No.: 12/955,614

(22) Filed: Nov. 29, 2010

(65) Prior Publication Data
US 2012/0134294 A1 May 31, 2012

(51) Int. Cl.
H04L 12/28 (2006.01)
(52) U.S. Cl.
USPC .......................................... 370/254

(58) Field of Classification Search
USPC .......................... 370/254, 331, 332; 455/453
See application file for complete search history.

(56) References Cited

U.S. PATENT DOCUMENTS

| 6,738,625 | B1 * | 5/2004 | Oom et al. | 455/453 |
| 2010/0017247 | A1 * | 1/2010 | Liu et al. | 705/8 |
| 2011/0047011 | A1 * | 2/2011 | Tirpak | 705/14.1 |

* cited by examiner

Primary Examiner — Robert Wilson
Assistant Examiner — Kevin Lee

(57) ABSTRACT

A method and apparatus for providing planning of a plurality of radio network controllers in a wireless network are disclosed. For example, the method obtains input data, and determines a limit for at least one radio network controller parameter in accordance with the input data. The method determines if the limit for the at least one radio network controller parameter is exceeded and determines an optimal output for an objective function, wherein the objective function is based on a plurality of penalty factors, if the limit for the at least one radio controller parameter is exceeded.

19 Claims, 4 Drawing Sheets

METHOD AND APPARATUS FOR PLANNING RADIO NETWORK CONTROLLERS IN A WIRELESS NETWORK

The present disclosure relates generally to communication networks and, more particularly, to a method and apparatus for planning radio network controllers in a wireless network, e.g., a cellular network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a mobile device is dependent on the availability of capacity on various network elements, e.g., radio access networks, cell site equipment, and so on. The service provider then needs to perform capacity planning and manage the performance of the network. However, capacity planning requires consideration of many factors such as load balancing, capital cost, etc. One approach for planning capacity is manually manipulating parameters associated with each relevant factor until an experienced planner deems the result satisfactory. Unfortunately, this manual approach is labor intensive and highly non-optimal for capacity planning of large networks.

SUMMARY OF THE DISCLOSURE

In one embodiment, the present disclosure describes a method and apparatus for providing planning of a plurality of radio network controllers in a wireless network. For example, the method obtains input data, and determines a limit for at least one radio network controller parameter in accordance with the input data. The method determines if the limit for the at least one radio network controller parameter is exceeded and determines an optimal output for an objective function, wherein the objective function is based on a plurality of penalty factors, if the limit for the at least one radio controller parameter is exceeded.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for planning radio network controllers in a wireless network, e.g., a cellular network. Although the teachings of the present disclosure are discussed below in the context of a wireless network, the teaching is not so limited. Namely, the teachings of the present disclosure can be applied for other types of networks, wherein the planning of capacity requires simultaneous consideration of multiple factors.

Figure 1:
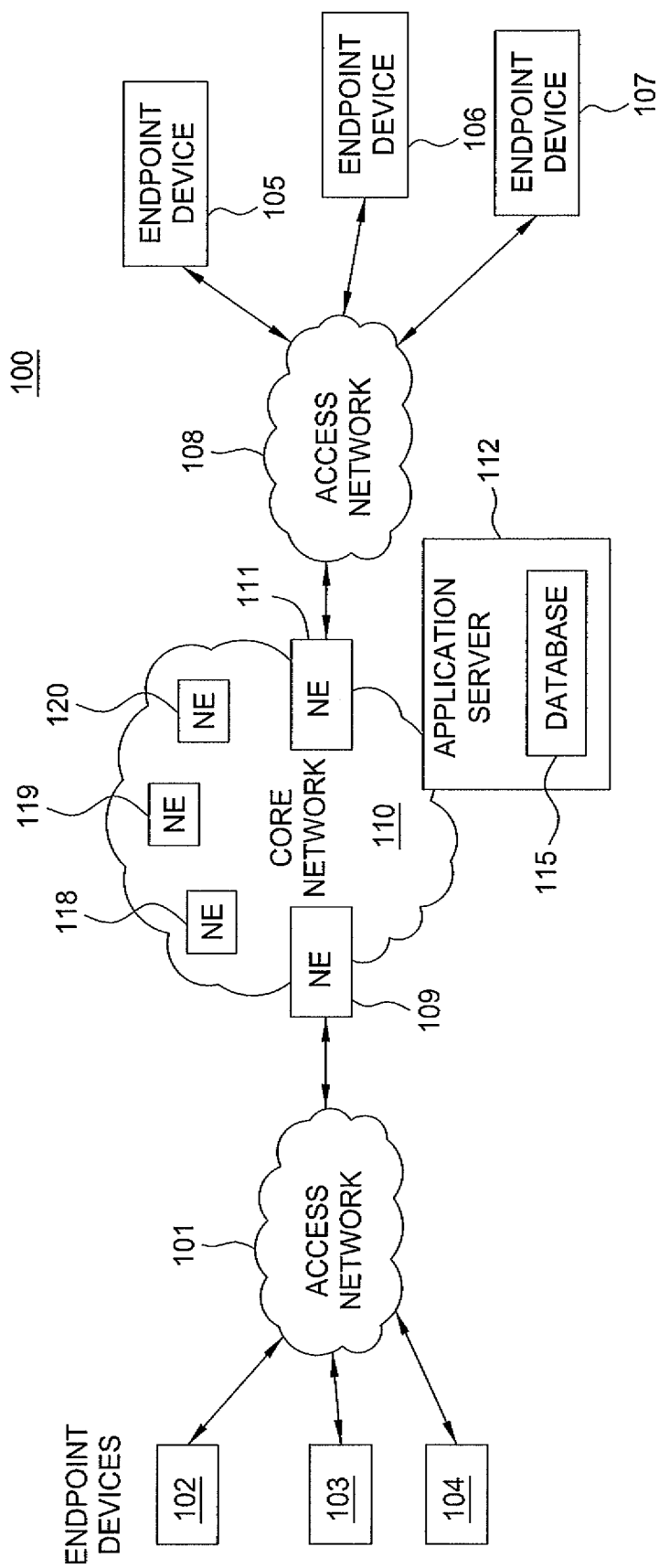
FIG. 1 is a block diagram depicting an illustrative network related to the current disclosure.

FIG. 1 is a block diagram depicting an illustrative network 100 related to the current disclosure. Illustrative networks may include Internet protocol (IP) networks, IP Multimedia Subsystem (IMS) networks, Ethernet networks, wireless networks and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a $3^{rd}$ party network, a cellular network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network. For example, a customer may use a cell phone or a smart phone to access Internet Protocol (IP) services, multimedia services, and the like. The packets from and to the wireless device, e.g., cell phone, may then traverse one or more radio access networks and equipment, e.g., base stations, backhaul equipment, etc.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized.

In one embodiment, each base station in a wireless network is controlled by a radio network controller (RNC). However, the wireless network may have a plurality of radio network controllers. For each base station, a specific radio network controller is then selected from among the plurality of radio controllers. The assigning of a base station to a specific radio network controller may also be referred to as homing. For example, a specific base station "A" may be homed to a specific radio network controller "X." The specific radio network controller X is then responsible for controlling the traffic traversing through the base station A. If at a later time period, another radio network controller Y is selected to control the traffic traversing through the base station A, the base station A is said to be re-homed to the radio network controller Y.

In order to describe a typical user interaction with the radio network controller and base stations, suppose a user initiates a call via the base station A which is controlled by the radio network controller X. Suppose the user then moves from one cell site to another cell site necessitating a hand over from the base station A to a second base station B. If the call is being handed over to a base station in another radio network controller's territory (e.g., radio network controller Y controlling base station B), the radio network controller X needs to hand over the call to the radio network controller Y. This example illustrates that if the first and the second base stations are not controlled by the same radio network controller, then the call may need to be handed over to another radio network controller. The handover from one radio network controller to another radio network controller requires extra signaling, and may incur delay. The relative merit of load balancing among a plurality of radio network controllers against the resulting increase in handover traffic may then need to be evaluated. Therefore, a method for providing capacity planning for radio network controllers that takes into account various factors, e.g., penalty factors, will be beneficial to service providers of radio access networks.

In one embodiment, the current method performs the planning of the deployment of radio network controllers in accordance with several factors, e.g., the need to provide load balancing among the existing radio network controllers, the need to minimize the handover of traffic across radio network controller boundaries, the need to minimize capital cost of deploying new radio network controllers, the need to minimize base station re-homing, the need to minimize the number of radio network controllers assigned to base station groups, the need to minimize cost of backhauling (radio access network transport cost), the need to automatically incorporate key radio network controller parameters computed based on actual observations, the need to account for network performance data, the need to account for user behavior data, and the like.

As illustrated by the above example, the penalties (broadly advantages and disadvantage) associated with load-balancing and handover minimization need to be carefully weighed against each other. Moreover, user considerations (e.g., user behavior data) may affect the relative weighting between load balancing and handover minimization. For example, a group of base stations may be intentionally grouped together and will be better served by the same radio network controller. For example, if most calls are among users communicating via a specific set of base stations, then keeping the set of base stations under control of the same radio network controller should be beneficial. However, in another example, load balancing may be more important than keeping the group of base stations under the control of the same radio network controller, i.e., the traffic load can be divided among a plurality of radio network controllers.

In one embodiment, the number of radio network controllers assigned to the base station groups may be defined based on geographical clustering. For example, proximity to large sports and cultural venues may benefit from an increase in the connectivity among a plurality of base stations. In one embodiment, various radio network controller parameters computed based on actual observations may be used in market specific call models for future radio network controller capacity planning.

In one embodiment, there may be constraints placed on homing requirements of the base stations. For example, certain base stations may be required to be controlled by a given radio network controller, certain base stations may be required not to be controlled by a given radio network controller, certain groups of base stations may be required to be controlled by the same radio network controller, and so on.

In one embodiment, user behavior data and preference data are used to capture the dynamic nature of user applications. For example, new applications may impose different constraints in terms of the amount of traffic the radio network controller needs to handle. For example, a new application may impose a higher throughput requirement as opposed to an older application. For example, an application that transmits image data (e.g., medical images, pictures, etc.) will likely impose a higher throughput than an application for supporting voice only conversations. In another example, downloads of movies, and videos will likely impose an even higher throughput requirement.

In one embodiment, radio network controllers that control base stations at different physical locations may have different requirements. For example, a radio network controller that controls base stations in a large metropolitan area, in a sports venue, etc. may have a different requirement as compared to a radio network controller controlling base stations in a less densely populated area.

In one embodiment, the call models for calls traversing the base stations may change over time. For example, a call model may change based on season of the year, day of the week, time of day, an introduction of new user device types, an introduction of new applications, etc. Since the call models are dynamic, the performance of the radio network controllers needs to be assessed based on the changing call models. For example, a radio network controller may be adequate to control a large number of base stations near a sports venue when the venue has limited use. However, when the venue is fully utilized, additional radio network controllers may be needed. Thus, the call models and user behavior will affect the performance of the radio network controllers in the network throughout the life of the radio network controllers.

In one embodiment, the current method gathers network performance data to evaluate how well the radio network controllers are meeting the various requirements. For example, a radio network controller's performance may be measured in terms of how many Erlangs the radio network controller can handle, the bi-directional throughput values, the controller's capacity limit, etc. The performance data for each radio network controller is then obtained and analyzed to evaluate key performance parameters. The result of the analysis may then be used for radio network controller planning.

In one embodiment, the radio network controller planning may be used to provide efficient boundary for base station homing, re-homing, or a combination of homing and re-homing. For example, the method may provide a radio network controller plan, for each forecasting period, such that all business, cost and engineering constraints are met. Thus, one goal is then to minimize the overall penalty factors. In one example, base stations in a 3G network (e.g., referred to as Node B) may be re-homed based on a computation of capacity planning. It should be noted that the reference to the 3G network is only illustrative and should not be interpreted as a limitation of the present disclosure. In one example, the planning may be used to determine an optimal upgrade or deployment schedule for new and/or existing radio network controllers.

In order to provide the planning of the radio network controllers while considering all of the above penalty factors, the current method first defines an objective function that is based on one or more of the penalty factors described above.

In one embodiment, the objective function is defined based on the following penalty factors: geographical clustering, handover traffic, load balancing, base station re-homing and budgetary limitations (e.g., cost of a radio network controller). In one embodiment, the objective function is expressed as:

$$\sum_{NEWRNC} Y[NEWRNC, t] *$$
$$(CapEx[NEWRNC, t] + OpEx[NEWRNC, t] +$$
$$Monthly[NEWRNC, t]) + \sum_{j \in ALLRNC} PenaltyofDist *$$
$$\left(\sum_{NodeB} X[i, j, t] * Distance[i, j, t]\right) +$$
$$\sum_{j \in ALLRNC} IuR\_Bandwidth[j, t] * PenaltyofHO *$$
$$slider\_scale + \sum_{j \in ALLRNC} PenaltyofLB *$$
$$\left(\left(\sum_{NodeB} X[i, j, t] * CPU[i, t]\right) - AvgCPULoad\right)^2 +$$
$$\sum_{j \in ALLRNC} \sum_{NodeB \in RNC} \{If(X[i, j, t] - X[i, j, t-1] \neq 0)$$
$$then\ 1\ Otherwise\ 0\} * PenaltyofRH * slider\_scale$$

Equation (1)

For clarity purposes, the various terms used in the above equation (1) are described below. The optimal solution for equation (1) may be found using a linear programming method. For example, a linear programming solver may be used. The decisions associated with the optimal solution take only integer values. For example, the decisions may involve one or more of: how many new radio network controllers are needed, which one of the radio network controllers should be used to connect to each base station, etc. Hence, the problem may be defined as a mixed integer programming problem. For ease of understanding, a first decision variable to represent a connection between a base station (NodeB) and a radio network controller (RNC), and a second decision variable to indicate if a new RNC should be added are first defined.

The first decision variable is Variable X[NodeB,RNC,t], which is defined as a set of binary variables X that represent the connection between NodeB and RNC in time period t, wherein $$X[NodeB, RNC, t] = \begin{cases} 1, & \text{If } NodeB \text{ connects to the } RNC \text{ (existing or new) in time period } t \\ 0, & \text{Otherwise.} \end{cases}$$

The variables X are defined over all possible connection combinations between NodeB and RNC in time period t. For example, for a specific NodeB, there is a group of n RNCs to which the NodeB can be connected. Accordingly, a group of variables X[NodeB, RNC1, t], X[NodeB, RNC2, t], . . . , X[NodeB, RNCn, t] are defined. It is important to note that one and only one variable X in this group must have a value of one (implying a connection to the specific RNC), the rest of the variables X have a value of zero (implying no connection to the specific RNC).

In order to ensure that a base station is connected only to one RNC, the current method utilized an additional constraint:

$$\sum_{RNC \in Market} X[NodeB, RNC, t] = 1, \forall\ NodeB.$$

The second variable is Variable Y[NEWRNC, t], which is defined as a set of binary variables Y that represent if a new RNC is to be added in time period t, wherein $$Y[NEWRNC, t] = \begin{cases} 1, & \text{if } NEWRNC \text{ is added in time period } t. \\ 0, & \text{Otherwise.} \end{cases}$$

The variables Y are defined over all possible new RNC locations. In order to ensure that no base station is connected to the new RNC unless the new RNC is added to the market, the current method adds the following logical constraint:

$$\Sigma_{NodeB} X[NodeB, NEWRNC, t] \leq Y[NEWRNC, t] * BigM,$$
$$\forall NEWRNC.$$

wherein, the BigM represents a large number, e.g., 10,000. If Y[NEWRNC,t]=0, the inequality forces the summation at the left hand side to be equal to zero. This implies that no NodeB can be connected to the new RNC if the RNC is not added to the market.

Then, the method defines terms that serve as weight factors for differentiating the relative importance of a particular penalty factor as compared to other penalty factors in the objective function. Each penalty factor then has a weight factor that differentiates the relative importance of the penalty factor as compared to other penalty factors. In one example, the penalty for re-homing may be more important than the penalty for meeting budget targets. In another example, the penalty associated with load balancing may be more important. The current method defines PenaltyofHO, PenaltyofLB, PenaltyofRH, and PenaltyofDist to act as weights to corresponding terms in the overall objective function. PenaltyofHO is a weight for relative importance of handover penalty, PenaltyofLB is a weight for relative importance of load balancing, PenaltyofRH is a weight for relative importance of re-homing and PenaltyofDist is a weight for relative importance of geographical clustering.

In one embodiment, a user may modify the weight factor associated with a penalty factor. For example, the weight factor associated with a penalty factor can be modified using a slider scale with values from "zero" to "one". For example, moving a slider scale for PenaltyofLB towards "one" gives more importance to load balancing as compared to other penalties. In one embodiment, a default value of 0.5 is assigned to a slider scale associated with any one of the above penalties.

Returning to Equ. 1, a new radio network controller (RNC) is deployed if the new RNC meets budgetary limitations. The current method incorporates the penalty associated with budgetary limitations in the objective function via the term:

$$\sum_{NEWRNC \in Market} Y[NEWRNC, t] * (CapEx[NEWRNC, t] + OpEx[NEWRNC, t] + MonthOpEx[NEWRNC, t])$$

The objective function accounts for penalty associated with handover via the terms:

$$\sum_{RNC \in Market} IuR_{Bandwidth[RNC,t]} *$$
$$PenaltyofHO \text{ and } IuR\_Bandwidth[RNC, t] =$$
$$\sum_{NodeBi} \sum_{NodeBj} \{If((X[NoteBi, RNC, t] = 1 \text{ and } X[NodeBj, RNC, t] = 0)$$
$$\text{or } (X[NoteBi, RNC, t] = 0 \text{ and } X[NodeBj, RNC, t] = 1))$$
$$\text{then } HO\_Traffic[NodeBi, NodeBj, t], \text{Otherwise } 0\}$$

The penalty of handover, PenaltyofHO, is the penalty for one unit of handover traffic, and IuR_Bandwidth[RNC,t] is the total handover traffic at a given RNC. The formula realizes the logic that if the base stations i and j (Node Bi and Node Bj) are connected to different RNCs, a penalty HO Traffic [NodeBi, NodeBj,t]*PenaltyofHO, is added; otherwise, there is no handover penalty. For example, a linear programming solver may be used to solve the objective function while forcing the total handover traffic to be as low as possible.

The objective function includes the penalty associated with load balancing via the term:

$$\sum_{RNC \in Market} PenaltyofLB *$$
$$\left(\left(\sum_{NodeB} X[NodeB, RNC, t] * CPU[NodeB, t]\right) - AvgCPULoad\right)^2$$

wherein, $$AvgCPULoad = \frac{\sum_{NodeB} CPU[NodeB, t]}{NumberofRNC}$$

As the equation indicates, the load balancing is based on a control plane central processing unit (CPU) utilization. The objective is defined such that: the total of the differences between the traffic loading at each RNC and the average load is as small as possible. Since the objective function is solved while minimizing $((\Sigma_{NodeB \in RNC} X[NodeB,RNC,t]*CPU[NodeB,t])-AvgCPULoad)^2$, the loading on an RNC, $\Sigma_{NodeB} X[NodeB, RNC,t]*CPU[NodeB,t]$, becomes as close as possible to the average CPU loading.

The objective function includes the penalty associated with re-homing via the term:

$$\sum_{RNC \in Market} PenaltyofRH *$$
$$\left(\sum_{NodeB \in RNC} \{If(X[NodeB, RNC, t] - X[NodeB, RNC, t-1] \neq 0)\right.$$
$$\left. \text{then } 1 \text{ Otherwise } 0\}\right)$$

The penalty associated with re-homing refers to a penalty term for re-homing a base station from one RNC to a different RNC. As described above, X[NodeB, RNC,t] is the decision variable of connection between a NodeB and an RNC in the current time period, and X[NodeB, RNC, t−1] is the decision variable between the same pair of NodeB and RNC but in the previous time period. Thus, the formula enforces the logic that if a NodeB in the current time period connects to the same RNC that it was connected to in the previous time period, then there is no re-homing penalty. Otherwise, a re-homing penalty is applied. Including the re-homing penalty in the objective function has the effect of keeping the number of re-homings as small as possible.

The objective function includes the penalty associated with connecting a base station to an RNC which is not geographically the closest to the base station via the term:

$$\sum_{RNC \in Market} PenaltyofDist *$$
$$\left(\sum_{NodeB} X[NodeB, RNC, t] * Distance[NodeB, RNC, t]\right)$$

The distance between a NodeB and the location of an RNC is represented by Distance[NodeB,RNC,t]. The location of the RNC is defined as the centroid of an RNC based on the latitude and longitude of the nodeBs that are connected to the RNC. Including the penalty for connecting to an RNC that is not geographically the closest has the effect of clustering the NodeBs (base stations) to their closest RNC, in terms of geographical location.

The objective function of equation (1), needs to be solved subject to business, cost and engineering constraints. For example, interface ports have limits on throughput. In another example, the cost of the radio network controller has constraints. The capacity of each radio network controller is clearly bounded, and so on.

In one embodiment, the equation (1) is solved via a linear programming solver by: adding a necessary number of new RNCs; evaluating all possibilities of base station assignments to the RNCs (new and existing); and achieving an optimal solution. The optimal solution satisfies all business, cost and engineering constraints, while minimizing the objective function defined by equation (1).

The current method includes the engineering, cost and business constraints by first classifying the constraints into one or more of the following categories: user traffic constraints, interface port constraints or control plane constraints. The user traffic constraints, interface port constraints and control plane constraints are related to one or more constraints of the radio network controller parameters.

In order to simplify the description of the parameters related to each constraint, first let:

$$IuPS_{Bandwidth[RNC,t]} = \text{Max}\{DL_{Data[RNC,t]}, UL_{Data[RNC,t]}\}$$

$$SYSBH_{Data[RNC,t]} = ICBH_{R99_{Data[RNC,t]}} + ICBH_{HSDPA[RNC,t]} + ICBH_{HSUPA[RNC,t]}$$

$$IuCS\_Bandwidth[RNC, t] = f(VoiceErlang[RNC, t], DataErlang[RNC, t])$$

$$HO\_Traffic[Nodeb1, Nodeb2] = HO\_Fraction[Nodeb1, Nodeb2] * Secondary\_Traffic[Nodeb1] + HO\_Fraction[Nodeb2, Nodeb1] * Secondary\_Traffic[Nodeb2]$$

$$IuR\_Bandwidth[RNC, t] = \sum_{i \in NodeB} \sum_{n \in NodeB} \{\text{If}((X[i, RNC, t] = 1 \text{ and } X[n, RNC, t] = 0)$$
$$\text{or } (X[i, RNC, t] = 0 \text{ and } X[n, RNC, t] = 1))$$
$$\text{then } HO\_Traffic[i, n, t], \text{Otherwise } 0\}$$

Then, the current method relates the user traffic constraints to the constraints of the RNC parameters: sector count, Erlang, busy hour data (e.g., in Mbps), and busy hour call attempts (BHCA).

In one embodiment, the constraint on a sector count parameter is defined as:

$$\sum_{NodeB} X[NodeB, RNC, t] * CellCount[NodeB, t] \leq$$
$$CellCountCapacity[RNC, t] * CellCountEngrLimit.$$

In one embodiment, the constraint on a busy hour call attempt parameter is defined as:

$$\sum_{NodeB} X[NodeB, RNC, t] * BHCA[NodeB, t] \leq BHCACapacity[RNC, t]$$

Wherein, $BHCA[NodeB, t] = VoiceErlang[NodeB, t]$
$$\frac{3600}{ICBH\_IuCSBH\_Erlang\_Ratio[RNC, t] * MHT[RNC, t]}$$

and, MHT is the Mean Hold Time at an RNC level.

In one embodiment, the current method relates the control plane constraints to the constraints of the RNC parameter of a CPU load. The parameter of the CPU load comprises one or more of: a resource management parameter and a mobility management parameter.

In one embodiment, the parameter of the CPU load is defined as:

$$RNC[CPU,t] \leq RNC\_DATA\_THRPT\_CAPACITY*CPU\_ENGR\_LIMIT$$

Wherein, RNC[CPU,t] is a function of Voice Erlangs and Data;

$$RNC[CPU,t]=f(\text{Voice},\text{Data}).$$

In one embodiment, the current method relates the interface port constraints to the constraints of the RNC parameters:

IuB: Interface to link the RNC with a NodeB;
IuCS: Interface to link the RNC with a 3G MSC;
IuPS: Interface to link the RNC with a 3G SGSN;
IuR: Interface between two RNC.

In one embodiment, the constraint on the RNC parameter IuB is defined based on the interface type. For example, the interface type may be a T1 interface or an OC3 (optical carrier level 3) interface.

In one embodiment, the constraint on the RNC parameter IuB for a T1 interface is defined as:

$$\sum_{NodeB} X[NodeB, RNC, t] * \frac{T1Count[NodeB, t]}{84} \leq$$
$$c_1 IuBPortCapacity[RNC, t]$$

where $c_1$ is a constant.

In one embodiment, the constraint on the RNC parameter IuB for an OC3 interface is defined as:

$$\sum_{NodeB} X[NodeB, RNC, t] * IuB\_Thrupt[NodeB, t] \leq$$
$$1024 * 150 * IuBPortCapacity[RNC, t]$$

where, $$IuB\_Thrupt[NodeB, t] = f(IuB\_Voice\_Thrupt[NodeB, t]) + f(IuB\_Data\_Thrupt[NodeB, t])$$

In one embodiment, the constraint on the RNC parameter IuPS is defined based on the interface type. For example, the interface type may be an OC3 (optical carrier level 3) interface.

In one embodiment, the constraint on the RNC parameter IuPS for an OC3 interface is defined as:

$$c_2 \frac{IuPS_{Bandwidth[RNC,t]}}{149760} \leq IuPSPortCapacity[RNC, t];$$

where $c_2$ is a constant.

In one embodiment, the constraint on the RNC parameter IuCS is defined based on the interface type. For example, the interface type may be an OC3 (optical carrier level 3) interface.

In one embodiment, the constraint on the RNC parameter IuCS for an OC3 interface is defined as:

$$c_3 \frac{IuCS_{Bandwidth[RNC,t]}}{149760} \leq IuCSPortCapacity[RNC, t];$$

where $c_3$ is a constant.

In one embodiment, the constraint on the RNC parameter IuR is defined based on the interface type. For example, the interface type may be an OC3 (optical carrier level 3) interface.

In one embodiment, the constraint on the RNC parameter IuR for an OC3 interface is defined as:

$$c_4 \frac{IuR_{Bandwidth[RNC,t]}}{149760} \leq IuRPortCapacity[RNC, t]$$

where $c_4$ is a constant.

Figure 2:
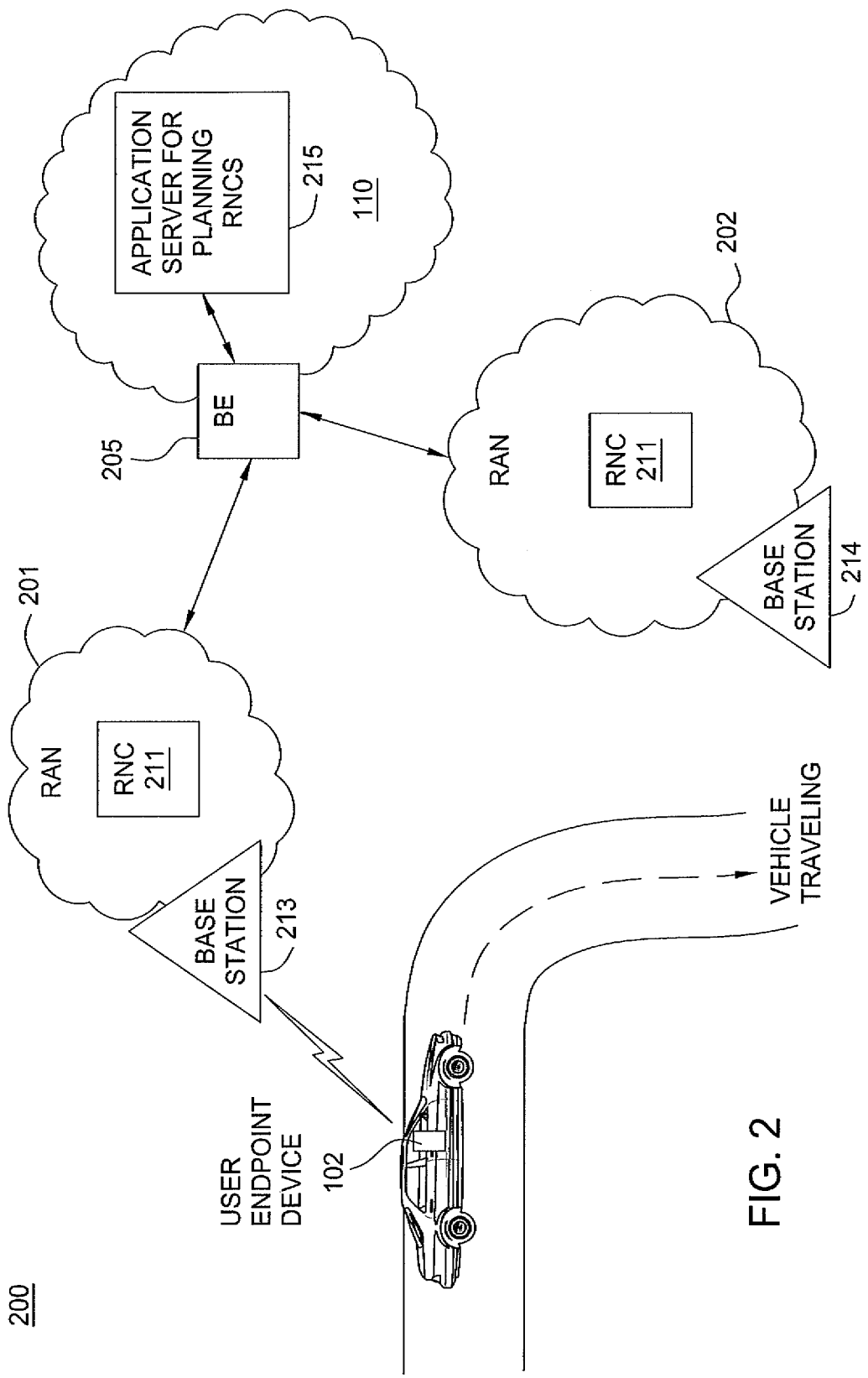
FIG. 2 provides an exemplary network with the current method of planning radio network controllers.

FIG. 2 provides an exemplary illustration 200 of a network with the current method of planning radio network controllers. For example, the current method for planning radio network controllers is implemented in an application server 215 located in the core network 110. Alternatively, the application server 215 can be deployed external to the core network. The end point devices communicate with the core network 110 via radio access networks 201 or 202 and border element (BE) 205. The radio access network 201 comprises the base station 213 which is controlled by a radio network controller 211. The radio access network 202 comprises the base station 214 which is controlled by a radio network controller 212. The user of the endpoint device 102 may travel from a geographical area served by the base station 213 to a geographical area served by the base station 214. As the user travels to various locations, the radio network controller 211 may have to handover an ongoing call to the radio network controller 212. It should be noted FIG. 2 only provides simplified views of the radio access networks. As such, additional base stations and radio network controllers can be deployed without changing the scope of the present disclosure.

In one embodiment, the current method provides planning of radio network controllers and their respective boundaries based on one or more of the above factors such that a plurality of radio network controllers may function optimally network wide. It should be noted that the present method does not require that all of the above factors be considered. The factors that will be considered will be governed by the requirements of a particular deployment.

In order to provide planning of the radio network controllers, the current method calculates values for one or more radio network controller parameters. The parameters may be needed for one or more of the penalty factors of the objective function. For example, a parameter may affect one or more of: penalty factor associated with geographical clustering, penalty factor associated with handover traffic, penalty factor associated with load balancing, penalty factor associated with base station re-homing, and penalty factor associated with budgetary limitations.

In one embodiment, the input data for calculating the values for the one or more radio network controller parameters may comprise one or more of:
  busy hour demand forecast;
  transport cost (backhauling);
  radio network controller locations;
  handover data;
  unit cost for new radio network controller and the time required to deploy new radio network controller;
  unit cost for re-homing and time required for re-homing;
  unit cost for software upgrade and time required for software upgrade;
  user preference to allow or disallow a new radio network controller, re-homing and/or software upgrade; and
  user preference to control quantity and time of new radio network controller, re-homing and/or software upgrade.

In one embodiment, the method may then analyze the results to determine if limits for any of the one or more radio network controller parameters are exceeded. If the limits are exceeded, the method then proceeds to identify an optimal output. In one embodiment, if limits are not reached or exceeded, re-optimizing may be performed to provide an improvement. In one embodiment, if the limits are not reached, the method for the optimization may simply be delayed until new data is gathered.

In one embodiment, the current method provides an optimal output that may comprise: adding one or more new radio network controllers, providing load balancing among existing radio network controllers, minimizing handover traffic, and performing upgrades on existing radio network controllers. The optimal output is derived by finding the optimal solution for the objective function of Equ. 1.

In one embodiment, the current method provides one or more of the following schedules or reports based on the above optimal output:
  a time series for radio network controller additions;
  a time series for radio network controller upgrades;
  a time series for base station re-homing and/or load balancing;
  a time series for base station to a radio network controller assignment; and
  reports for triggering radio network controller or base station related activities.

Figure 3:
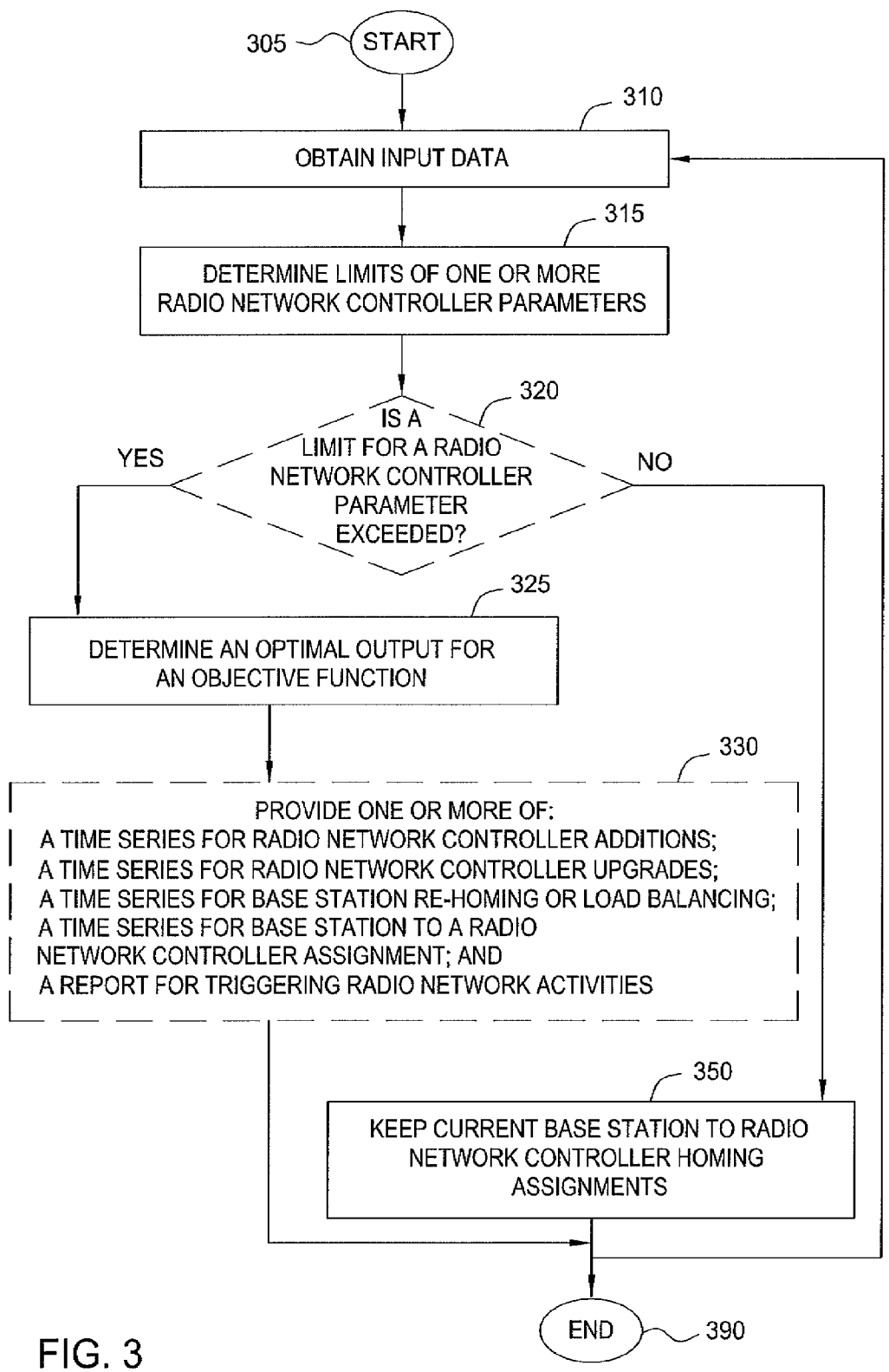
FIG. 3 illustrates a flowchart of the method for planning radio network controllers in a wireless network.

FIG. 3 illustrates a flowchart of the method 300 for planning radio network controllers in a wireless network, e.g., a cellular network. The method 300 may be implemented in an application server (or a general purpose computer as disclosed in FIG. 4 below) located in the service provider's network. For example, the method is implemented in the application server 215 deployed in the core network 110. Method 300 starts in step 305 and proceeds to step 310.

In step 310, method 300 obtains input data for determining values of one or more radio network controller parameters. The input data may comprise one or more of:
  busy hour demand forecast;
  transport cost (backhauling);
  radio network controller locations;
  handover data;
  unit cost for new radio network controller and the time required to deploy new radio network controller;
  unit cost for re-homing and time required for re-homing;
  unit cost for software upgrade and time required for software upgrade;
  user preference to allow or disallow a new radio network controller, re-homing and/or software upgrade; and
  user preference to control quantity and time of new radio network controller, re-homing and/or software upgrade.

In step 315, method 300 determines the values (broadly limits) of the one or more radio network controller parameters. For example, the method may determine Erlangs for each radio network controller, performance data for each radio network controller, backhauling cost for each radio network controller, etc.

In optional step 320, method 300 determines if a limit for a radio network controller parameter is exceeded. For example, throughput limits, may be reached for one or more radio network controller. In another example, the performance of one or more radio network controllers may be degraded. In one embodiment, if at least one limit is exceeded, the method automatically proceeds to step 325. However, it should be noted that method 300 can be triggered even if no limit has been exceeded. For example, the method 300 can be triggered manually if there is a need or a desire to perform a re-optimization analysis. Otherwise, the method proceeds to step 350, or alternatively step 325 also to re-optimize the base station to radio network controller connectivity.

In step 325, method 300 determines an optimal output for an objective function, wherein the objective function is based on one or more penalty factors. For example, the objective function may be defined based on one or more of the following penalty factors: geographical clustering, handover traffic, load balancing, base station re-homing and one or more budgetary limitations. The optimal output is then the output that minimizes the penalty over all the penalty factors. That is, the optimal output minimizes the objective function provided in Equ. (1).

In one embodiment, the current method provides an optimal output that may comprise: adding new radio network controllers, providing load balancing among existing radio network controllers, minimizing handover traffic, and performing upgrades on existing radio network controllers. The method then proceeds to an optional step 330.

In optional step 330, method 300 provides one or more of the following outputs based on the above optimal output:
- a time series for radio network controller additions;
- a time series for radio network controller upgrades;
- a time series for base station re-homing and/or load balancing;
- a time series for base station to a radio network controller assignment; and/or
- reports for triggering radio network controller or base station related activities.

The method then either proceeds to step 390 to end processing the current planning data, or to return to step 310 to receive more input data.

In step 350, method 300 keeps the current base station to radio network controller homing assignments. The method then either proceeds to step 390 to end processing the current planning data, or to return to step 310 to receive more input data.

It should be noted that although not specifically stated, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
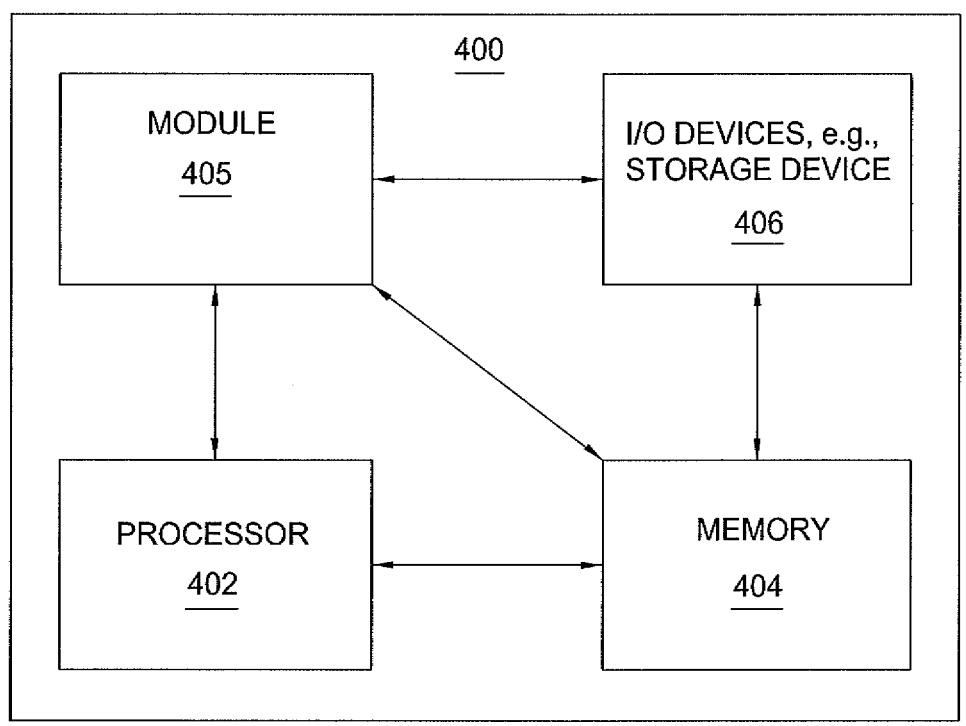
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for planning radio network controllers in a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 405 for planning radio network controllers in a wireless network, can be loaded into memory 404 and executed by processor 402 to implement the functions as discussed above. As such, the present method 405 for planning radio network controllers in a wireless network (including associated data structures) of the present disclosure can be stored on a non-transitory computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing planning of a plurality of radio network controllers in a wireless network, comprising:
   obtaining, by a processor, input data;
   determining, by the processor, a limit for a radio network controller parameter in accordance with the input data;
   determining, by the processor, if the limit for the radio network controller parameter is exceeded; and
   determining, by the processor, an optimal output for an objective function, wherein the objective function is based on a plurality of penalty factors, when the limit for the radio controller parameter is exceeded, wherein the plurality of penalty factors comprises a penalty factor associated with a budgetary limitation comprising a number of new radio network controllers multiplied by a sum of a capital expenditure, an operating expenditure and a monthly operating expenditure, wherein the optimal output for the objective function is solved via a linear programming solver by adding the number of new radio network controllers and evaluating a plurality of possibilities of base station assignments to the number of new radio network controllers and one or more existing radio network controllers.

2. The method of claim 1, further comprising:
providing a schedule based on the optimal output, wherein the schedule comprises a time series for radio network controller additions.

3. The method of claim 1, further comprising:
providing a schedule based on the optimal output, wherein the schedule comprises a time series for radio network controller upgrades.

4. The method of claim 1, further comprising:
providing a schedule based on the optimal output, wherein the schedule comprises a time series for base station re-homing and load balancing.

5. The method of claim 1, further comprising:
providing a schedule based on the optimal output, wherein the schedule comprises a time series for base station to a radio network controller assignment.

6. The method of claim 1, further comprising:
providing a schedule based on the optimal output, wherein the schedule comprises a report for triggering radio network related activities.

7. The method of claim 1, wherein the plurality of penalty factors comprises a penalty factor associated with geographical clustering.

8. The method of claim 1, wherein the plurality of penalty factors comprises a penalty factor associated with handover traffic.

9. The method of claim 1, wherein the plurality of penalty factors comprises a penalty factor associated with load balancing.

10. The method of claim 1, wherein the plurality of penalty factors comprises a penalty factor associated with base station re-homing.

11. The method of claim 1, wherein each penalty factor of the plurality of penalty factors has a weight factor that differentiates a relative importance of each penalty factor as compared to other penalty factors of the plurality of penalty factors.

12. The method of claim 11, wherein the weight factor is modified by a user.

13. The method of claim 11, wherein the weight factor is modified using a slider scale.

14. The method of claim 13, wherein the slider scale has a value set between a value of zero and a value of one.

15. The method of claim 13, wherein the slider scale has a default value.

16. The method of claim 1, wherein the input data comprises a busy hour demand forecast.

17. The method of claim 1, wherein the input data comprises a user preference.

18. A non-transitory computer-readable medium storing a plurality of instructions which, when executed by a processor, cause the processor to perform operations for providing planning of a plurality of radio network controllers in a wireless network, the operations comprising:
obtaining input data;
determining a limit for a radio network controller parameter in accordance with the input data;
determining if the limit for the radio network controller parameter is exceeded; and
determining an optimal output for an objective function, wherein the objective function is based on a plurality of penalty factors, when the limit for the radio controller parameter is exceeded, wherein the plurality of penalty factors comprises a penalty factor associated with a budgetary limitation comprising a number of new radio network controllers multiplied by a sum of a capital expenditure, an operating expenditure and a monthly operating expenditure, wherein the optimal output for the objective function is solved via a linear programming solver by adding the number of new radio network controllers and evaluating a plurality of possibilities of base station assignments to the number of new radio network controllers and one or more existing radio network controllers.

19. An apparatus for providing planning of a plurality of radio network controllers in a wireless network, comprising:
a processor; and
a non-transitory computer-readable medium storing a plurality of instructions which, when executed by the processor, cause the processor to perform operations, the operations comprising:
obtaining input data;
determining a limit for a radio network controller parameter in accordance with the input data;
determining if the limit for the radio network controller parameter is exceeded; and
determining an optimal output for an objective function, wherein the objective function is based on a plurality of penalty factors, when the limit for the radio controller parameter is exceeded, wherein the plurality of penalty factors comprises a penalty factor associated with a budgetary limitation comprising a number of new radio network controllers multiplied by a sum of a capital expenditure, an operating expenditure and a monthly operating expenditure, wherein the optimal output for the objective function is solved via a linear programming solver by adding the number of new radio network controllers and evaluating a plurality of possibilities of base station assignments to the number of new radio network controllers and one or more existing radio network controllers.

* * * * *